July 3, 1928.
B. C. VON PLATEN ET AL
1,675,474
REFRIGERATOR OF THE ABSORPTION TYPE
Filed Oct. 2, 1925
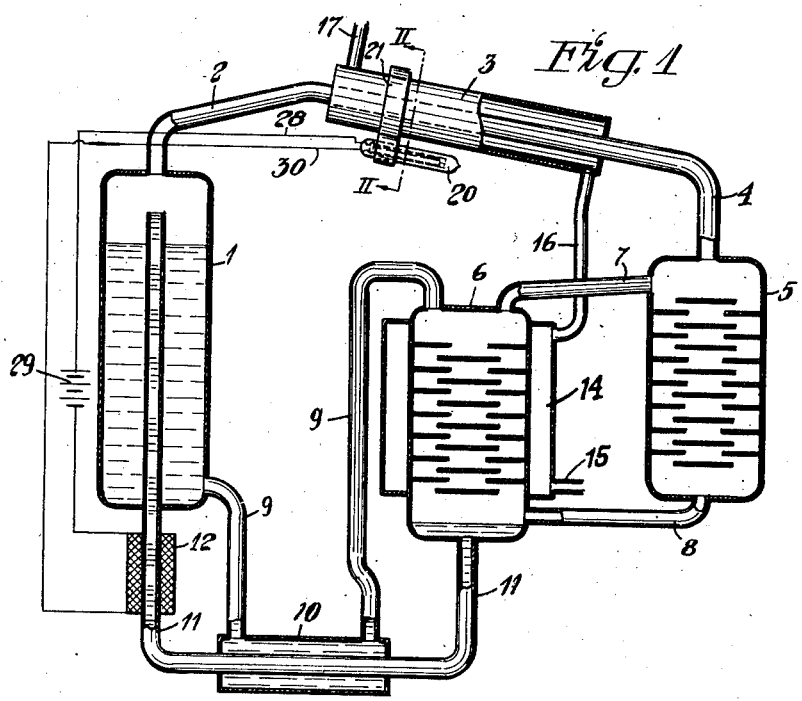
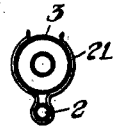
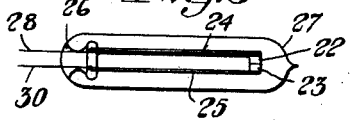
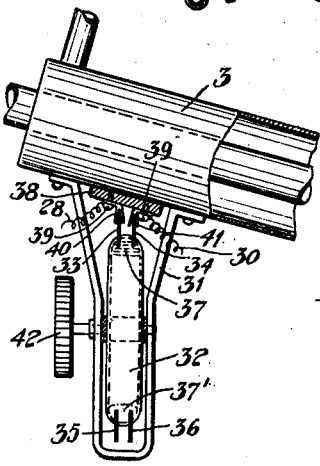
INVENTORS
Baltzar Carlson Platen
Carl Georg Munters
by Wm T Hedlund
THEIR ATTORNEY.

Patented July 3, 1928.

1,675,474

UNITED STATES PATENT OFFICE.

BALTZAR CARL von PLATEN AND CARL GEORG MUNTERS, OF STOCKHOLM, SWEDEN, ASSIGNORS, BY MESNE ASSIGNMENTS, TO ELECTROLUX SERVEL CORPORATION, A CORPORATION OF DELAWARE.

REFRIGERATOR OF THE ABSORPTION TYPE.

Application filed October 2, 1925, Serial No. 60,088, and in Sweden September 15, 1925.

The present invention refers to refrigerators of the absorption type which are driven entirely by means of heat and in which the part or parts giving off heat are cooled by means of a cooling liquid, for instance water.

The principal object of the invention is to provide safety means controlled by a factor influencing the normal operation of the refrigerator, said means being adapted to control the heating means of the refrigerator on variations in said factor. This control of the heating means is preferably such that the said safety means brings the heating means out of service, when said factor attains a predetermined value.

If said factor is the temperature within the refrigerator, for instance within its condenser, said safety means may consist of a relay which is adjusted to a certain temperature so as to place said heating means out of service when said temperature has been attained, and to bring said heating means into service again, when the temperature decreases below the value, to which said relay is adjusted. In most cases said heating means consists of an electric heating element, and in such case the relay will consequently open and close the circuit of said element respectively, according to the temperature within the apparatus, for instance in its condenser.

Still further objects will appear from the following specification, reference being had to the accompanying drawing, in which several embodiments of the invention are illustrated, but it may be explicitly pointed out here that the embodiments shown in the drawing are only to be considered as examples of different forms of the safety means according to the invention, which is in no way limited to the embodiments illustrated.

In the drawing—

Fig. 1 is a diagrammatic section of a refrigerator of the absorption type having a relay adapted respectively to open and close the circuit of the electric heating means of the refrigerator according to the temperature within the condenser.

Fig. 2 is a section on the line II—II of Fig. 1.

Fig. 3 is a view of the relay on an enlarged scale.

Fig. 4 is a view of another embodiment of the safety means according to the invention.

First, a short description will be given of the general construction and operation of the refrigerator shown in Fig. 1.

1 designates a generator containing an absorption liquid in which a cooling agent is dissolved. In the following description it may be assumed that the absorption liquid is water, and the cooling agent ammonia. Gaseous ammonia driven out in said generator 1 is conducted through the conduit 2 into a condenser 3 where the ammonia is caused to condense. The ammonia thus condensed flows through the conduit 4 into an evaporator 5, which is simultaneously supplied with an inert gas, for instance hydrogen, from the absorber 6, through the conduit 7. In the evaporator 5, the ammonia evaporates, whereby heat is absorbed, said heat being taken from the surroundings of the evaporator 5. On account of the mixture of gaseous ammonia and hydrogen having a higher specific weight than the hydrogen, said mixture flows downwardly in the evaporator 5, and then flows through the conduit 8 into the absorber 6, in which the gaseous mixture is brought into contact with weak ammonia solution coming from the generator 1 through the conduit 9 and a heat exchanger 10 inserted in said conduit 9. In the absorber 6, said solution absorbs gaseous ammonia, and the solution enriched in ammonia collects in the lower part of the absorber 6, from which it flows into the generator 1 through the conduit 11 and the heat exchanger 10. The conduit 11 is heated by means of an electric heating element 12, whereby the liquid in that branch of the conduit 11 is driven upwards. When the gaseous ammonia is dissolved in the liquid in the absorber 6, heat is generated, which heat must be led off, and to this end the absorber 6 is provided with a cooling jacket 14 to which cooling liquid, for instance water, is supplied through the conduit 15 and led away through the conduit 16 to the condenser 3, from which the cooling liquid is led away through the conduit 17. The hydrogen contained in the gaseous mixture flowing from the evaporator 5 into the absorber 6 is not absorbed by the absorption liquid but ascends in the absorber on account of its low specific weight and is returned to the evaporator 5 through the conduit 7.

According to the invention a relay, designated in its entirety by 20, is suspended from the condenser 3 close by the same, for instance by means of a spring-holder having at its lower end a circular opening, into which the relay 20 is inserted and maintained by friction, and being otherwise U-shaped so that its resilient legs may be clamped around the condenser (see especially Fig. 2). The relay 20 comprises two contact pieces 22 and 23 (see especially Fig. 3), each secured to the free ends of two tongues 24 and 25 respectively, said tongues being secured in a foot 26 at the one end of a tube 27 consisting, for instance, of glass, which tube may be evacuated or filled with an inert gas. The one tongue 24 consists of two metal laminæ of different coefficients of expansion and soldered together so as to form a so called bimetallic or thermostat lamina, whereas the other tongue consists, for instance, of steel. The tongue 24 is connected with one terminal of an electric battery 29 by means of a conducting wire 28, the other terminal of said battery being connected to one terminal of the electric heating element 12, whereas the other tongue 25 is connected to the other terminal of said element 12 by means of a conducting wire 30.

The construction of the relay is previously known, and in the present patent application no protection is claimed for such a relay per se.

The operation is as follows:

If, for some reason or other, the temperature in the condenser 3 and consequently also in the relay 20 rises and attains a predetermined value to which the relay is adjusted, the tongue 24 will be bent out from the tongue 25 on account of the different expansion of the two metal laminæ of which said tongue 24 is composed, whereby the contact 22, 23 and, consequently, the circuit of the electric heating element 12 will be interrupted. By this means the refrigerator will be protected against any unpermitted rise of temperature which might otherwise cause bursting of the refrigerator or otherwise cause injury thereto. When the refrigerator then cools, so that the temperature in the condenser 3 and, consequently, also in the relay 20 decreases below the temperature limit to which the relay 20 is adjusted, the contact 22, 23 will again be closed, causing restarting of the refrigerator. If, for instance, the rise of temperature resulted from an interruption in the supply of cooling liquid and said fault has been removed during the time in which the refrigerator has been out of service, the machine will resume its normal function, but if the fault is still at hand, the relay will again interrupt the current, as soon as the temperature in the condenser 3 attains the predetermined value.

Fig. 4 shows another embodiment of the relay which in this case has the form of an electric switch. Secured to the condenser 3 is a stirrup 31 in which a tube 32 is swingably mounted, said tube being made of electrically non-conducting material, for instance glass. Fused into the glass at each end of said tube 32 are two contacts 33, 34 and 35, 36 respectively, and in the tube there is a little body 37 of an electrically conducting material adapted to melt at the temperature at which the circuit is to be interrupted. Furthermore, there is secured on the condenser 3 a plate 38 of electrically insulating material, in which plate 38 two contacts 40, 41 are secured by means of screws 39 or the like, each of said contacts 40, 41 consisting of two resilient contact tongues, the outer ends of which are bent somewhat outwards so that the contacts on the tube 32 may easily engage between the respective tongues and make good electric contact therewith. The one pivot of the tube 32 is extended outwards, and secured on said extension is a little band-wheel 42. Conducting wires 28 and 30 extend from the contacts 40, 41 to the battery 29 and the electric heating element 12.

The operation is as follows:

When the temperature in the condenser 3 and consequently also in the relay attains a certain value, the little metal body 37 melts and falls down onto the bottom of the tube 32, thus taking up the position 37¹, whereby the circuit of the element 12 is interrupted. The tube 32 may then be swung half a revolution by means of the hand-wheel 42, so that the contacts 35, 36, which in the figure are shown at the lower end of the tube, are caused to engage the knife-contacts 40, 41, whereby the circuit will be reclosed.

This relay may preferably be combined with an indicating device of any kind, for instance, an electric lamp or the like which will indicate interruption of the current and, consequently, announce the fact that the refrigerator does not work normally, for some reason or other.

By means of a safety device of this kind, the great advantage is gained that the circuit of the electric heating element 12 will be automatically broken on an incidental interruption of the supply of water, whereby all risk of the refrigerator bursting or otherwise being injured under such circumstances is avoided.

While we have shown and described specific devices for carrying out our invention, it is to be fully understood that other devices performing the desired functions may be employed and structural design varied without departing from the spirit or scope of the invention.

What we claim is:—

1. A refrigerating system comprising a generator, an evaporator, heat rejecting means including an element continuously supplied with both a hot fluid and a cold fluid in normal operation, a source of heat for said generator arranged to continuously supply heat thereto, a thermostat responsive to a temperature resultant of the supply of hot and cold fluids to said element and means responsive to said thermostat to control the supply of heat to said generator, said thermostat being operative to interrupt the supply of heat to the generator upon an increase of temperature to a high value due to cessation of supply of cold fluid to said element and being inactive during normal operation.

2. A refrigerating system comprising a generator, an evaporator, an absorber, a condenser, means to continuously supply cooling fluid to said absorber and to said condenser, said generator constituting a continuous source of supply of heat to said condenser, a source of heat for said generator arranged to continuously supply heat thereto, a thermostat situated to be influenced by changes of temperature occurring in said condenser and means responsive to said thermostat to control the supply of heat to said generator, said thermostat being operative to interrupt the supply of heat to the generator upon an increase of temperature to a high value due to cessation of supply of cooling fluid to said condenser and being inactive during normal operation.

3. A heat operated refrigerating system normally operating under a constant pressure, all parts thereof being connected in open communication and being arranged for the circulation of an absorption liquid, a cooling agent, and an inert gas in the presence of which the cooling agent evaporates, said parts including a generator, an evaporator and an element continuously and simultaneously supplied with both a hot fluid and a cold fluid in normal operation, a source of heat for said generator arranged to continuously supply heat thereto and means responsive to a temperature resultant of the supply of hot and cold fluids to said element operative to control said source of heat.

In testimony whereof we affix our signatures.

BALTZAR CARL von PLATEN.
CARL GEORG MUNTERS.